United States Patent [19]

Rolker et al.

[11] Patent Number: 4,825,198

[45] Date of Patent: Apr. 25, 1989

[54] METHOD OF AND APPARATUS FOR TESTING THE TIGHTNESSES OF TWO VALVES ARRANGED IN A FLUID LINE

[75] Inventors: Jürgen Rolker, Westerkappeln; Peter Doerfler, Melle; Volker Kleine; Johannes Meyknecht, both of Osnabrück, all of Fed. Rep. of Germany

[73] Assignee: G. Kromschröder Aktiengesellschaft, Osnabrück, Fed. Rep. of Germany

[21] Appl. No.: 168,262

[22] Filed: Mar. 15, 1988

[30] Foreign Application Priority Data

Mar. 16, 1987 [DE] Fed. Rep. of Germany ....... 3708471

[51] Int. Cl.$^4$ ............................................. G08B 21/00
[52] U.S. Cl. .................................. 340/605; 73/40.5 R
[58] Field of Search .................... 340/605; 73/40.5 R, 73/46

[56] References Cited

U.S. PATENT DOCUMENTS 3,583,842 6/1971 Hancock et al. ................... 73/46 X
3,624,627 11/1971 Evans .......................... 73/40.5 R X

FOREIGN PATENT DOCUMENTS 1038693 8/1983 U.S.S.R. .......................... 73/40.5 R

Primary Examiner—Stewart J. Levy
Assistant Examiner—Joseph W. Roskos
Attorney, Agent, or Firm—Spensley Horn Jubas & Lubitz

[57] ABSTRACT

To test the tightnesses of two valves arranged upstream respectively downstream of each other in a fluid line, the pressure conditions in the line portion between the two valves is measured with both valves being closed. Following a certain time after the closure of the two valves, the pressure in the line portion is measured to determine whether pressure is above or below a predetermined limit pressure to conclude whether the one or the other valve is tight. Following this determination, the passageway is opened across the valve taken to be tight and the line portion is then drained or filled. During a measuring time interval then following, a differential pressure sensing device measures whether and how often the pressure in the line portion reaches or passes the limit pressure. The valve not yet taken to be tight is judged tight if the limit pressure is reached or passed once and considered not to be tight if the limit pressure is not reached or passed or reached or passed more than once during the measuring time.

19 Claims, 4 Drawing Sheets

METHOD OF AND APPARATUS FOR TESTING THE TIGHTNESSES OF TWO VALVES ARRANGED IN A FLUID LINE

BACKGROUND OF THE INVENTION

1. Field of the Invention

The present invention relates to the field of tightness testing and, more particularly, to a method of and an apparatus for testing the tightness of two valves arranged upstream respectively downstream of each other in a fluid line by measuring the pressure in the line portion between said two valves with said two valves being closed.

2. Prior Art

Two valves arranged in series are fitted for safety reasons mainly in lines taking fuel gas to gas-burning apparatuses. The tightnesses of said valves are tested at least prior to the start-up of such a gas-fuelled apparatus and in many cases after the shut-down of such an apparatus to establish when gas first leaks across one of said valves at a rate in excess of a predetermined letby rate. The cost of such a tightness test must be reasonably low, since it would otherwise be more cost-effective to incorporate a third valve in such a fuel gas line and to shorten maintenance intervals.

One of the conventional methods of testing the tightnesses of two valves arranged in such a manner in a fuel gas line provides for venting the line portion between said two valves and for measuring the pressure in said line portion after it has been vented. If no pressure build-up in said line in excess of a defined maximum pressure build-up is then measured, the upstream valve is judged to be substantially tight. Said line portion is thereupon filled and the pressure therein is again measured. If no pressure decay in excess of a maximum pressure drop is then found during said second measurement, the downstream valve is judged to be sufficiently tight. The conventional method hereinbefore described hence employs a pre-determined program implying always two switching operations each followed by a pre-determined measuring tim interval, making said method somewhat inflexible and relatively time-consuming.

The West German patent application No. 3 409 050 proposes the use of a pump to increase the pressure in the line portion between two such valves to a pressure in excess of the pressure upstream of the upstream valve and claims that if the pressure in said line portion does not rise to a pre-determined level within a pre-determined time period, pressure measurement will show which one of said two valves is not sufficiently tight. The method proposed by said patent application does not reflect actual operating conditions, though, because the pressure build up in the line portion between said two valves reduces the load to which the upstream valve is exposed under operating conditions and increases the load to which the downstream valve is exposed under operating conditions. The method divulged by the West German patent application No. 3 409 050 is also relatively costly, since it requires the use of a pump operating at a flow rate which must be in keeping with the valve size.

The West German patent application No. 3 445 281 finally proposes a pre-determined pressure below the pressure upstream of the upstream valve to be obtained in the line portion between the two valves for the test. Said patent application continues to say that said relatively low pressure in said line portion must be monitored to establish whether said pressure increases or decreases at an unacceptable rate, the upstream valve not being sufficiently tight in the first case and the downstream valve not being sufficiently tight in the latter case. The reliability of the method proposed by said patent application No. 3 445 281 is inadequate, though, since both valves are taken to be sufficiently tight in the event of a failure preventing the detection or the signalling of a change in the pressure in the line portion between said two valves.

SUMMARY OF THE INVENTION

It is an object of the present invention to provide for a method of testing the tightnesses of two valves arranged in a common fluid line combining a simple test method and a simple test configuration with a high reliability of the test.

For such a test, the present invention proposes that said two valves should both be closed and that, after a certain holding time after the closure of said two valves, the pressure in the line portion between said two valves is measured to determine whether said pressure is above or below a pre-determined limit pressure to conclude whether the one valve or the other valve is tight. The one valve or the other valve is hence taken to be substantially tight while the valve not so taken to be substantially tight is tested for tightness in a second phase of a test cycle. Following the determination as to the tightness of the one valve or the other valve, a passageway is opened across the valve so taken to be substantially tight and the line portion between said two valves is either drained or filled. During a measuring time interval following said determination a sensing device determines whether and how often the pressure in said line portion reaches or passes said limit pressure. If the duration of said measuring time interval is selected appropriately, the number of times which said pressure reaches or passes said limit pressure is a measure of the tightness of the valve so tested. Said valve so tested is judged to be tight if said limit pressure is reached or passed once and judged not to be sufficiently tight if said limit pressure is not reached or passed or reached or passed more than once during said measuring time interval.

The present invention exploits the insight that, at any time after the holding time referred to hereinabove, the pressure condition in the line portion between said two valves allows a decision as to which one of said two valves is tight, neglecting the improbable possibility of both valves leaking at the same time at the same or a similar rate. Once said decision has been taken, the actual test and associated measurements may hence be limited to the other valve.

If, after said holding time, the pressure in the line portion between the two valves to be tested is below a pre-determined limit pressure, the upstream valve is tight. A passageway is thereupon opened across the upstream valve to fill said line portion between said two valves, the change in pressure inside said line portion during a measuring time interval allowing an evaluation of the tightness of the downstream valve.

If, on the other hand, following said holding time, the pressure in the line portion between the two valves is above said pre-determined limit pressure, the downstream valve is tight. The line portion between the two valves is thereupon drained across the downstream valve, the change in pressure in said line portion during a pre-determined measuring time interval allowing an evaluation of the tightness of the upstream valve.

In each of the two above cases, the pressure in the line portion between the two valves must, during the measuring time interval, pass the limit pressure once, an appropriate signal being generated when said limit pressure is passed, for the valve tested to be found sufficiently tight. If during said measuring time interval, no such signal is generated, then flow through the fluid line will not be permitted since one of the two valves is not sufficiently tight.

The leakage rate which may be allowed across a valve depends on the size of the valve. It is a feature of the present invention that the allowed leakage rate may be accounted for by an appropriate adjustment or pre-setting of the sensitivity of the arrangement exclusively by adjusting the measuring time interval.

According to the teachings of the present invention, the holding time is selected to allow for the necessary pressure equalization even if the pressure in the line portion between the two valves is, due to a pressure surge, higher than the pressure upstream of the upstream valve. If the tightness of the two valves are tested after a protracted period of shut-down during which the two valves have been closed, then the test may be made immediately without waiting for the end of a holding time.

The passageway between the line portion between the two valves and the upstream or the downstream line across the valve taken to be substantially tight may be opened by opening said valve or preferably by allowing the fluid to flow through a bypass line having a bypass line valve.

In a first preferred embodiment of the present invention, the line portion between the two valves is drained or filled at a high flow rate during a relatively short initial phase of the measuring time interval. Said high flow rate will cause the pressure in said line portion to change rapidly during said initial phase, the limit pressure level being passed during said rapid change. The valve to be tested is under these conditions insufficiently tight if said limit pressure is passed a second time during said measuring time interval.

In another advantageous embodiment of the present invention, the line portion between the two valves is drained or filled at a limited flow rate over the entire measuring time, said flow rate being preferably controlled by restricting flow through the bypass lines with bypass line valves bypassing the valves incorporated directly in the fluid line. If, using the aforedescribed embodiment of the present invention, the pressure in the line portion between the two fluid line valves does not pass the preset limit pressure, the valve tested is insufficiently tight. In the advantageous embodiment of the present invention described in this paragraph, the maximum allowable leakage rate across the valve tested and thence the sensitivity of the test may be adjusted by varying the bypass line fluid flow rate.

The preset limit pressure is preferably approximately half the fluid pressure upstream of the upstream valve, thereby testing both valves with the same sensitivity during a preset measuring time interval.

It is another advantageous characteristic of the present invention that the pressure determined in the line portion between the two valves may be the differential pressure between the actual pressure in said line portion and the pressure upstream of the upstream valve, thereby eliminating any influence of any change in said upstream pressure on the measurement.

The apparatus proposed by the present invention for testing the tightnesses of a first valve and a second valve arranged in a fluid line comprises means for sensing the pressure in the line upstream of said first valve, means for sensing the pressure in the line portion between said first valve and said second valve, a differential pressure sensing device to compare said upstream pressure and said pressure in said line portion and to generate a signal if a preset pressure difference limit is reached, timing means for defining a (minimum) holding time and a measuring time interval following said holding time and arbitration and switching means for selectively opening and closing a passageway between said line portion and the upstream line or the downstream line in response to said signal so generated by said differential pressure sensing device and for generating at least one output representative of the result of the tightness test. Said output representative of the result of the tightness test may either be a signal permitting fluid flow through the entire fluid line or, in the event of one of said two valves not being sufficiently tight, a signal indicating an alarm.

The switching means associated with said differential pressure sensing device are preferably coupled with valves arranged in controlled flow bypass lines bypassing the valves in said fluid line.

A particularly important application both of the method proposed by the present invention and of the apparatus proposed for the application of said method is represented by the automatic tightness testing of valves in gas lines taking fuel gas to gas-burning apparatuses. It is standard practice for such valves to be tested each time before such a gas-burning apparatus is started up, said test often being made automatically when the gas burner control unit is switched on.

DETAILED DESCRIPTION OF THE INVENTION

The present invention will now be described by reference to a method of and an apparatus for testing the tightnesses of two valves arranged in a gas line to a gas-burning apparatus, mentioning by way of example many details such as pressure differences between parts of the fluid line, special circuitry or holding times in order to facilitate the comprehension of the present invention. However, any person versed in the art will easily realize that the present invention may be exploited without reference to the details described herein. The description neglects, on the other hand, the details of some well-known components as, for example, signal processing units, switches, valves or switching functions in an effort to enhance the clarity of the presentation of the advantages of the present invention.

The method and the apparatus described hereinafter in more detail evaluate whether the two valves V1 and V2 arranged in gas line 1 are sufficiently tight. Said valves V1 and V2 are controlled by burner control unit GFA using controller 2. Referring now to the application of the present invention depicted in FIG. 1, said controller 2 automatically tests the tightnesses of the two valves V1 and V2 prior to each start-up of the burner receiving gas through line 1 (closing of temperature switch $\theta$). If said test shows that valve V1 or valve V2 is not tight, break contact ST arranged in the power line 3 serving burner control unit GFA is opened, whereas, if the test shows, that both valve V1 and valve V2 are sufficiently tight, break contact ST remains closed and make contact FR in line 3 is closed.

During such a tightness test, the pressure $p_z$ in line portion 4 between valves V1 and V2 is determined by means of a pressure sensing device 5 which is in the present example a differential pressure sensing device, the differential pressure being the difference between the pressure in said line portion 4 and the inlet pressure $p_e$ upstream of valve V1. Said pressure sensing said two pressures and defines a limit pressure $p_s$ which is preferably approximately half the inlet pressure $p_e$, as shown in FIGS. 1A and 1B.

Figure 1:
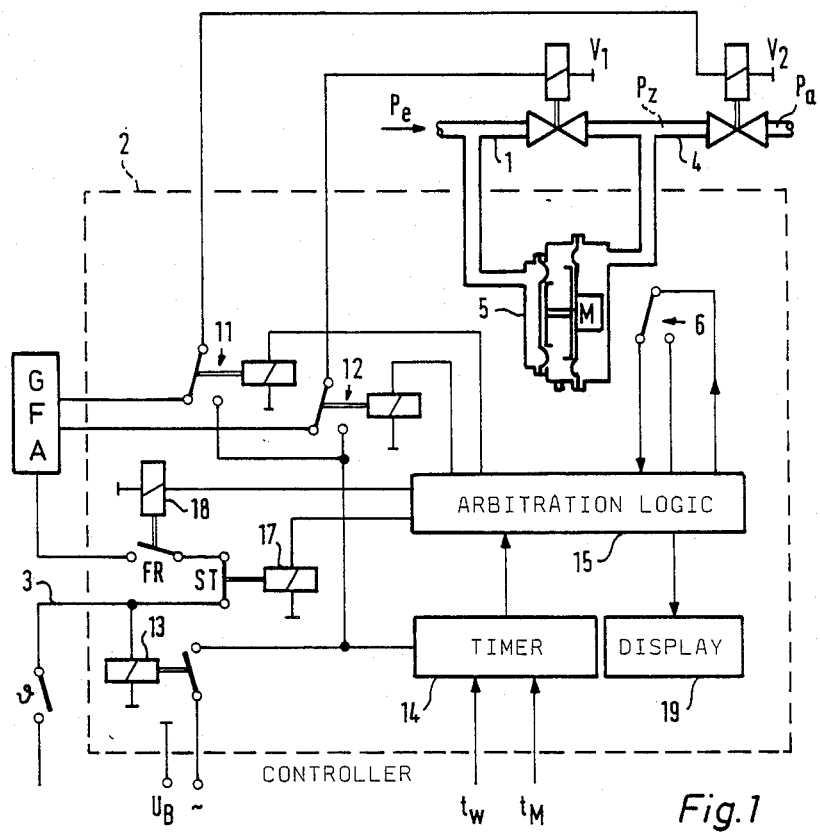
FIG. 1 is a schematic of the major components of one embodiment of the apparatus for testing the tightnesses of two valves arranged in a gas line to a gas-burning apparatus associated with a burner control unit provided for the control of gas flow through said line.

Said pressure sensing device 5 is coupled with switching means 6 shown schematically in FIG. 1 preferably without a mechanical contact between said pressure sensing device 5 and said switching means 6. In the embodiment of the present invention depicted in FIG. 1, the latter is a Reed contact actuated by a magnet M mounted on a diaphragm of pressure sensing device 5. Said switching means 6 is preferably a detecting device responding to the magnetic field of magnet M on pressure sensing device 5.

FIG. 1 is a schematic showing the apparatus during shut-down, contacts and FR in line 3 to the burner control unit GFA being open and the two valves V1 and V2 with exciter coils coupled with control outlets of burner control unit GFA across the switching contacts of relays 11 and 12 being in the closed positions. As the apparatus is started up by contact $\theta$ being closed, a relay 13 in the controller 2 is excited. By means of an appropriate contact, the operating voltage $U_B$ passes from relay 13 to controller 2, thereby activating timing means 14. Said timing means is programmable. In the embodiment of the present invention shown in FIG. 1, a (minimum) holding time $t_w$ and a measuring time interval $t_m$ may be input into timing means 14, measuring time interval $t_m$ immediately following holding time $t_w$ in the example described herein. However, said holding time $t_w$ may be transmitted to timing means 14 by a multiplicity of different means. Said timing means 14 thereupon energizes an arbitration logic (15) querying pressure sensing device 5 using switching means 6 (corresponding to the position of the Reed relay in the embodiment of the present invention described herein).

Figure 1A:
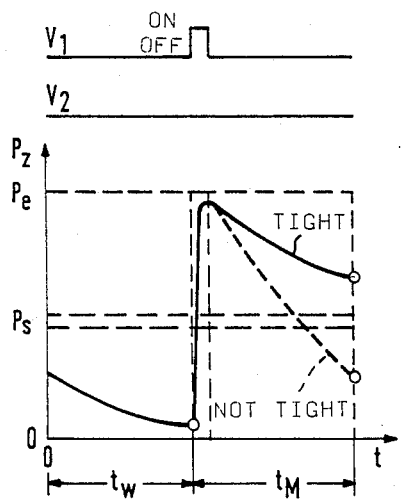
FIGS. 1A and 1B are graphs showing how the apparatus depicted in FIG. 1 may be used.
Figure 1B:
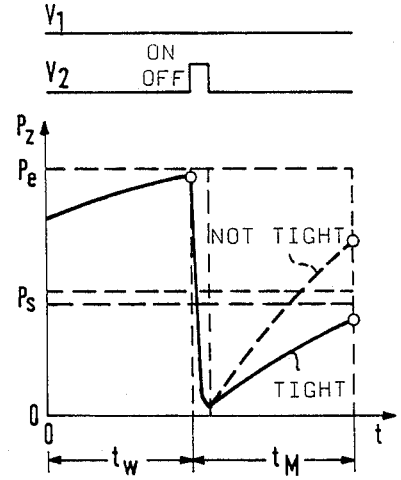

Referring now to FIG. 1A, the assumption being made that the arbitration logic 15 derives a substantial pressure difference between the pressure in the line upstream of valve V1 and line portion 4 between valve V1 and valve V2 from the position of switching means 6 and pressure $p_z$ hence being below limit pressure $p_s$ and valve V1 thence being sufficiently tight, the arbitration logic 15 outputs a control pulse to the exciter coil of relay 11, changing the position of said relay from the position depicted in FIG. 1 into the position in which it is in contact with the operating voltage terminal $U_B$. The solenoid valve V1 is thereupon excited and opened (see top curve in FIG. 1A). The control pulse causing valve V1 to open only exists during the initial phase of the measuring time interval $t_m$. As the pressure-versus-time curve depicted in FIG. 1A shows, said short pulse-like opening of valve V1 is sufficient for the pressure in line portion 4 to increase substantially to the inlet pressure level $p_e$, the pressure in said line portion 4 thereby passing once during said initial phase the limit pressure $p_s$. For the remainder of the measuring time interval $t_m$, the pressure $p_z$ in line portion 4 is a measure of the tightness of valve V2 tested in the example given herein. If, towards the end of the measuring time interval $t_m$, the pressure decreases again below the limit pressure ps, valve V2 is insufficiently tight. Such a decrease is signalled to arbitration logic 15 by a new change-over of switching means 6 which acts together with pressure sensing device 5 like a two-point controller during the measuring time interval $t_m$ and if two such changeover are so signalled to arbitration logic 15 during said measuring time interval $t_m$, said arbitration logic 15 emits a signal to relay 17 actuating break contact ST thereby reliably preventing the burner control unit GFA from being energized. If, on the other hand, following a short opening of valve V1, pressure $p_z$ does not decrease below limit pressure $p_s$ during the measuring time interval $t_m$, then valve V2 is judged to be tight and the arbitration logic 15 emits a signal to relay 18 actuating make contact FR.

In the graph depicted in FIG. 1B, the pressure $p_z$ at the end of the holding time $t_w$ is above the limit pressure $p_s$, the downstream valve V2 thence being tight. The arbitration logic 15 thereupon emits a short signal to relay 12, thereby switching the relay contact over to the operating voltage terminal $U_B$ opening valve V2 briefly. As valve V2 is opened briefly, gas is drained at a relatively high flow rate from line portion 4, pressure $p_z$ thereby decreasing rapidly as depicted in FIG. 1D. If, prior to the end of the measuring time interval $t_m$, pressure $p_z$ rises again and reaches or passes limit pressure $p_s$, valve V1 is judged to be insufficiently tight and break contact ST is opened.

In the embodiment of the present invention shown by FIG. 1, a readout 19 controlled by arbitration logic 15 displays the status of controller 2 and the result of the tightness test (V1 tight/not tight; V2 tight/not tight). However, such a readout is optional, as ignition is automatically authorized or locked through the operation of contacts ST and FR.

The configuration of arbitration logic 15 is not subject to any restrictions provided it allows for the above-described simple switching functions. Since output from said arbitration logic is only determined by whether or not a certain value is above or below a certain limit value, said logic may be developed easily by any person versed in the art, using known digital or analog components.

Figure 2:
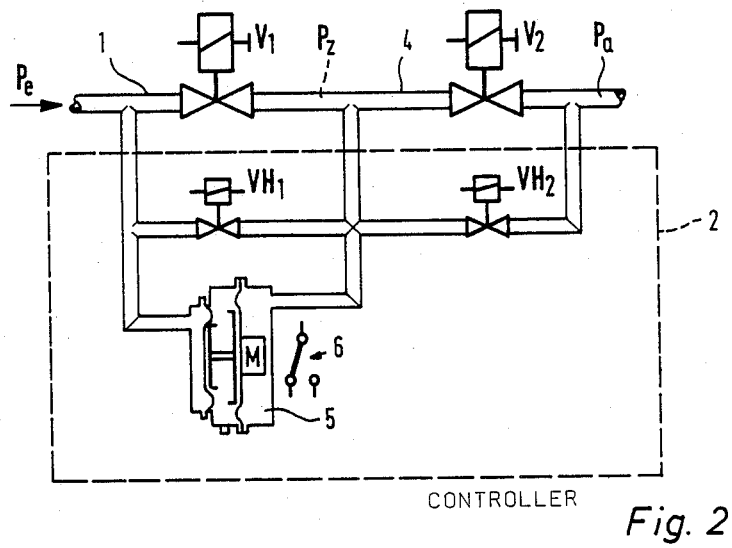
FIG. 2 is a schematic of another embodiment of the present invention differing from the embodiment shown in FIG. 1.
Figure 2A:
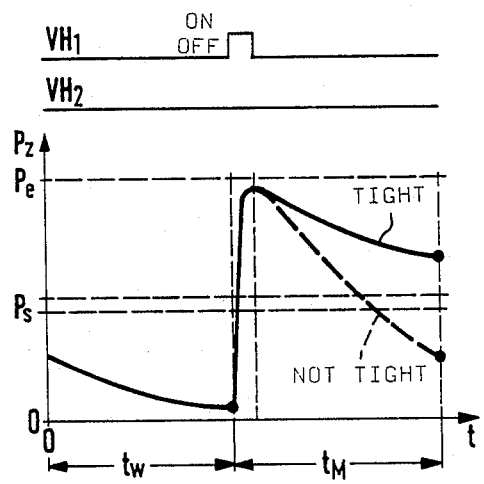
FIGS. 2A and 2B are graphs relating to the embodiment of the present invention shown in FIG. 2 in a similar manner as FIGS. 1A and 1B relate to the embodiment of the present invention depicted in FIG. 1.
Figure 2B:
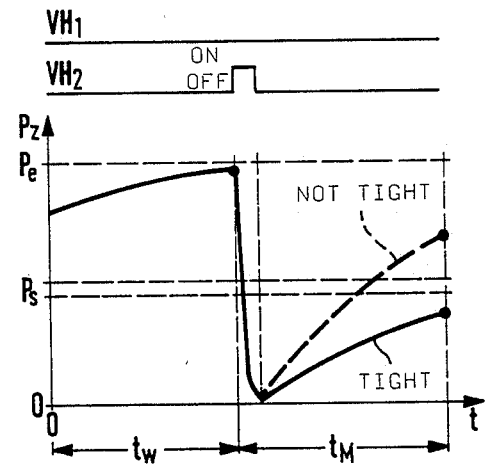

Referring now to FIG. 2, the apparatus depicted therein differs from the apparatus shown in FIG. 1 by a bypass line being associated with each of valves V1 and V2, the line bypassing valve V1 being provided with bypass line valve VH1 and the line bypassing valve V2 being provided with bypass line valve VH2. In the embodiment of the present invention depicted in FIG. 2, line portion 4 between valves V1 and V2 is filled or drained across bypass line valve VH1 or bypass line valve VH2. The arrangement of controller 2 in FIG. 2 is the same as the arrangement of controller 2 in FIG. 1 excepting the output signals from the arbitration logic which are transmitted to relays 11 and 12 for opening valves V1 and V2 in the case of th embodiment depicted in FIG. 1 and to the exciter coils of bypass valves VH1 and VH2 in the case of the embodiment depicted in FIG. 2. In all other respects, the mode of operation, the functions and the criteria used for authorizing burner start-up or generating an alarm are the same for the two embodiments of the present invention depicted in FIGS. 1 and 2, as a comparison of the graphs in FIGS. 2A and 2B with the graphs in FIGS. 1A and 1B confirms.

Figure 3:
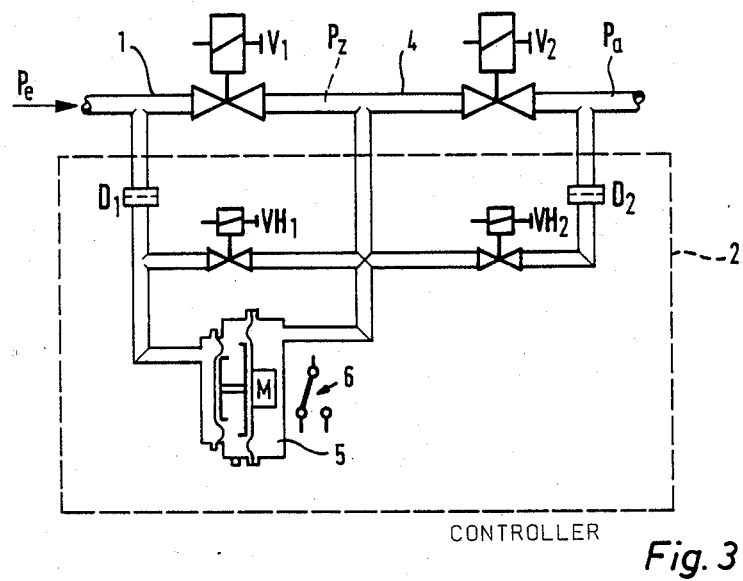
FIG. 3 is a schematic of a further embodiment of the present invention differing from the embodiment depicted in FIG. 2.

Referring now to FIG. 3 which is a simplified schematic of another embodiment of the present invention, the lines bypassing valves V1 and V2 are provided with flow restricting devices D1 and D2 in addition to the bypass line valves VH1 and VH2 for a different operation of the apparatus proposed by the present invention during the measuring time interval $t_m$.

As in the cases of the embodiments of the present invention depicted in FIGS. 1 and 2, a passageway between line portion 4 and the upstream or the downstream fluid line is at the beginning of the measuring time interval $t_m$ opened across valve V1 or valve V2, depending on whether the pressure in line portion 4, which may be below or above the limit pressure $p_s$, confirms at the end of the holding time that valve V1 or valve V2 is tight. In the example given by FIG. 3A, valve V1 was taken to be substantially tight and the tightness of valve V2 is tested during the measuring time interval $t_m$. As measuring time interval $t_m$ commences, line portion 4 is filled across flow restricting device D1 at a limited rate of flow, said rate of flow being set to reflect the maximum allowable leakage rate across valve V2. If the leakage across valve V2 is in excess of said maximum allowable leakage rate, pressure $p_z$ in line portion 4 will not rise to the limit pressure $p_s$ during measuring time interval $t_m$.

Figure 3A:
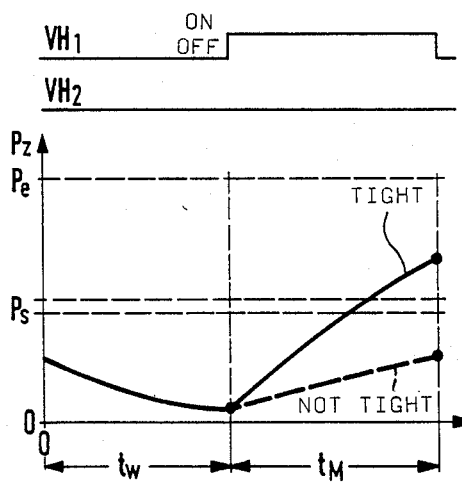
FIGS. 3A and 3B are graphs similar to the graphs depicted in FIGS. 2A and 2B, but relating to a tightness test using the embodiment of the present invention depicted in FIG. 3.
Figure 3B:
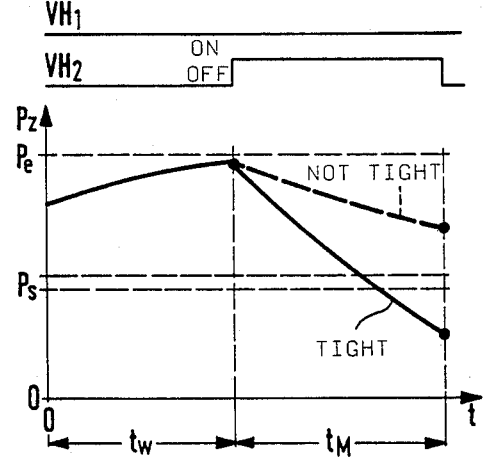
Figure 4:
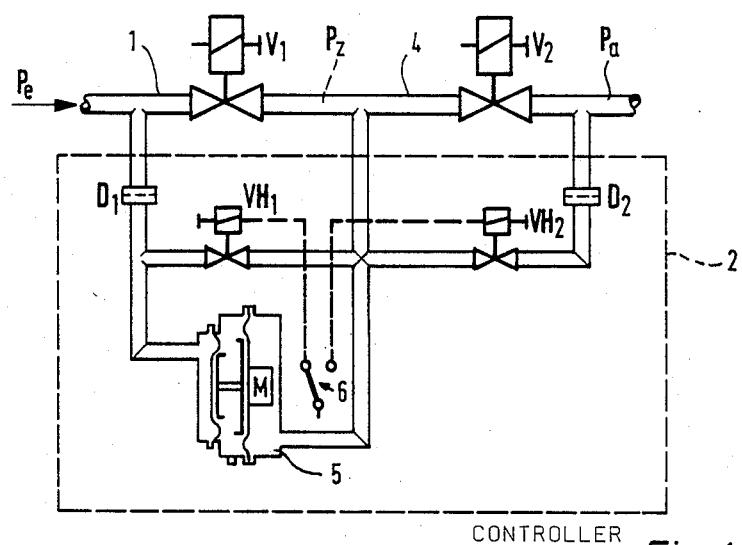
FIG. 4 is a schematic of a further embodiment of the present invention modifying the embodiment depicted in FIG. 3.
Figure 4A:
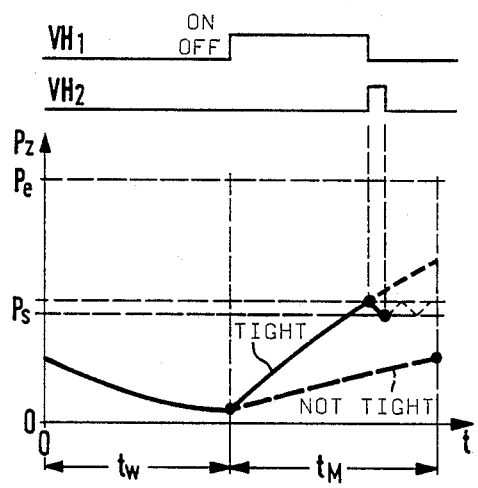
FIGS. 4A and 4B are graphs showing how the reference tightness test is made using the embodiment of the present invention depicted in FIG. 4.
Figure 4B:
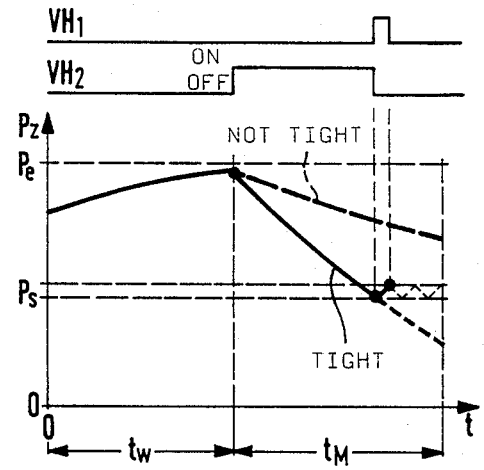

If however, said limit pressure is passed during measuring time interval $t_m$, as depicted in the example given in FIG. 3A, valve V2 is also judged to be tight. In the example depicted in FIG. 3B, the pressure $p_z$ at the end of the holding time $t_w$ indicates that valve V2 is tight. As the measuring time interval $t_m$ commences, line portion 4 between valve V1 and valve V2 is thereupon drained at a limited flow rate across bypass line valve VH2 and flow restricting device D2, the adjustment of flow restricting device D2 defining the maximum leakage rate allowed across valve V1 for valve V1 to be judged to be tight. If the leakage rate across valve V1 exceeds the maximum allowable leakage rate, the pressure $p_z$ in line portion 4 does not decrease below limit pressure $p_s$ during measuring time interval $t_m$, as fluid from upstream of upstream valve V1 enters line portion 4 across valve V1 at a relatively high flow rate. In the embodiment of the present invention shown by way of example in FIG. 4, line portion 4 between valve V1 and valve V2 is also filled and drained at a limited flow rate as in the case of the embodiment of the present invention depicted in FIG. 3. However, unlike the apparatus shown by way of example in FIG. 3, the arrangement depicted in FIG. 4 provides for switching means 6 actuated by pressure sensing device 5 to be directly coupled with bypass line valves VH1 and VH2. The pressure $p_z$ at the end of the holding time $t_w$ thence determines whether bypass line valve VH1 or bypass line valve VH2 is opened. As limit pressure $p_s$ is reached, a switchover is made to the bypass line valve previously not actuated, thereby allowing a check as to whether the switching means of controller 2 function.

The holding time $t_w$ must be sufficiently long for determining from pressure $p_z$ (being above or below the limit pressure) whether the tightness of valve V1 or the tightness of valve V2 is better. It is therefore only important to define a minimum holding time whereas it is unnecessary to fix a maximum holding time.

While the invention has been described with reference to two valves arranged in a gas line to a gas burner, it should be understood that the teachings of the invention are likewise applicable to testing the tightnesses of two valves arranged in a fluid line serving a similar or an entirely different purpose.

We claim:

1. A method of determining the tightnesses of a first and a second valve arranged in a fluid line and spaced relative to each other, said method comprising the steps of:

building up a pressure gradient in said fluid line so that the fluid tends to flow in one direction, a first one of said two valves thereby becoming an upstream valve and a second one of said two valves thereby becoming a downstream valve;

closing said two valves;

presetting a limit pressure in the range between the pressure upstream of said upstream valve and the pressure downstream of said downstream valve;

determining the pressure in the line portion between said upstream valve and said downstream valve and comparing said line portion pressure with said limit pressure;

taking said upstream valve to be substantially tight if after a holding time the pressure so determined is below said limit pressure and taking said downstream valve to be substantially tight if after said holding time the pressure so determined is above said limit pressure;

opening a passageway across said valve so taken to be substantially tight to allow the pressure in said line portion to change and to enable testing of the other valve not so taken to be substantially tight;

determining the pressure in said line portion and comparing the pressure so determined with said limit pressure; and judging said other valve to be substantially tight if, during a measuring time interval commencing upon the opening of said passageway, the pressure in said line portion does not reach said limit pressure less than one or more than once.

2. A method according to claim 1 wherein said limit pressure is preset with reference to the fluid pressure upstream of said upstream valve.

3. A method according to claim 2 wherein during said opening of said passageway, fluid is permitted to pass at such a relatively high flow rate that the pressure in said line portion passes said limit pressure during a relatively short initial period of said measuring time interval and the tightness of the valve not first taken to be substantially tight is ascertained in response to whether or not the pressure in said line portion reaches said limit pressure a second time during said measuring time interval.

4. A method according to claim 3 wherein said passageway is through said fluid line and is opened and closed by actuating the valve first taken to be substantially tight.

5. A method according to claim 3 wherein said passageway across said valve first taken to be substantially tight is through an associated bypass line said bypass line having a bypass line valve.

6. A method according to claim 2 wherein said passageway is open so as to permit fluid to pass at a limited rate of flow upon the commencement of said measuring time interval and wherein said limited rate of flow is substantially maintained throughout said measuring time interval.

7. A method according to claim 6 wherein said passageway across said valve so taken to be substantially tight is through a bypass line having a bypass line valve.

8. A method according to claim 7 wherein said rate of flow is limited by limiting flow through said bypass lines having said bypass line valves bypassing said first and said second valve by means of flow restricting devices.

9. A method according to claim 2 wherein a limit pressure signal is generated by a limit pressure transmitting device each time when said limit pressure is reached, each such limit pressure signal is transmitted to an arbitration logic and counted and an alarm signal is generated if the number of limit pressure signals counted until the end of said measuring time interval is not equal to unity.

10. A method according to claim 9 wherein at least one of the times from a group comprising the holding time and the measuring time interval is preset by a timing device and said timing device generates at the end of said time a signal enabling said arbitration logic.

11. A method according to claim 10 wherein said measuring time interval is preset in response to the sizes and the throughputs of the valves to be tested.

12. A method according to claim 2 wherein said limit pressure is preset at substantially half the fluid pressure upstream of said upstream valve.

13. An apparatus for testing the tightnesses of the first and the second valves arranged in a fluid line and spaced relative to each other, said fluid line comprising a line upstream of said first valve, a line portion between said first and said second valve and a line downstream of said second valve, said apparatus comprising:
first means for opening and closing a first passageway between said upstream line and said line portion;
second means for opening and closing a second passageway between said line portion and said downstream line;
first and second actuating means for actuating said first and second means;
means for sensing the pressure in said upstream-line;
means for sensing the pressure in said line portion;
means for comparing the pressure determined in said upstream line and the pressure determined in said line portion and for generating at least one signal upon reaching a predetermined difference between said two pressures, said comparing means being coupled with said sensing means;
timing means to define at least one measuring time interval following a holding time; and
arbitration and switching means for selectively actuating one of said first and second actuating means at the end of said holding time in response to said comparing means signal and for generating at least one output representative of the result of said tightness test said arbitration and switching means being coupled with said comparing means, said timing means and said first and second actuating means.

14. An apparatus according to claim 13 wherein said passageways are through said first valve and said second valve in said fluid line.

15. An apparatus according to claim 13 wherein said first passageway is through a first bypass line bypassing said first valve and said second passageway is through a second bypass line bypassing said second valve, said first means comprise a first bypass line valve in said first bypass line, and said second means comprise a second bypass line valve in said second bypass line.

16. An apparatus according to claim 15 wherein a flow restricting device is arranged in a bypass line in series with a bypass line valve.

17. An apparatus according to claim 13 wherein said comparing means comprises a pressure difference transmitter allowing to preset said predetermined limit pressure difference.

18. An apparatus according to claim 17 wherein a magnetic field dependent detecting device is coupled with said pressure difference transmitter and said arbitration and switching means to generate a switching signal for input into said arbitration and switching means each time when said limit pressure difference is reached or exceeded.

19. In a gas-burning apparatus having at least one gas line to take gas to a burning device and a control unit to control gas flow through said gas line, said gas line having a first valve and a second valve connected by a gas line portion, a method of determining the tightnesses of said first valve and said second valve prior to starting up said burning device, said method comprising the steps of:
determining the pressure in said gas line upstream of said first valve and the pressure in said gas line portion, both said valves being closed;
comparing the two pressures so measured at the end of a holding time and determining whether the pressure difference between said two pressures at the end of said holding time is above or below a preset pressure difference;
taking said first valve to be substantially tight if after said holding time said pressure difference is above said preset pressure difference and taking said second valve to be substantially tight if after said holding time said pressure difference is below said preset pressure difference;
opening a passageway across the valve so taken to be substantially tight, a measuring time interval commencing as said passageway is opened; comparing again said two pressures and determining each time said preset pressure difference is reached or exceeded;

and producing an enabling signal for opening said gas line if said preset pressure difference is reached or exceeded once during said measuring time interval and producing a signal locking said gas line if said preset pressure difference is not reached or exceeded or reached or exceeded more than once during said measuring time interval.

* * * * *